(12) United States Patent
Matsumoto et al.

(10) Patent No.: US 6,922,318 B2
(45) Date of Patent: Jul. 26, 2005

(54) GROUND RELAY SYSTEM IN A MULTIPLEX DIRECT GROUNDING SYSTEM

(75) Inventors: Tadashi Matsumoto, Tokyo (JP); Mitsuru Mitani, Tokyo (JP); Toshio Nomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 272 days.

(21) Appl. No.: 10/238,725

(22) Filed: Sep. 11, 2002

(65) Prior Publication Data

US 2003/0117755 A1 Jun. 26, 2003

(30) Foreign Application Priority Data

Dec. 25, 2001 (JP) ........................ 2001-391310

(51) Int. Cl.$^7$ ................................ H02H 3/00
(52) U.S. Cl. ........................... 361/42; 361/62
(58) Field of Search ................. 361/42–50, 62–69

(56) References Cited

U.S. PATENT DOCUMENTS

| | | | | |
|---|---|---|---|---|
| 3,617,812 A | * | 11/1971 | Deter | 361/64 |
| 4,297,740 A | * | 10/1981 | Hagberg | 361/67 |
| 4,600,961 A | * | 7/1986 | Bishop | 361/76 |
| 5,309,109 A | * | 5/1994 | Miyazaki et al. | 324/509 |
| 5,475,556 A | * | 12/1995 | Yoon et al. | 361/87 |
| 5,790,357 A | * | 8/1998 | Schiel | 361/36 |
| 5,892,646 A | * | 4/1999 | Parker et al. | 361/85 |
| 6,249,230 B1 | * | 6/2001 | Baldwin et al. | 340/650 |
| 6,369,995 B1 | * | 4/2002 | Kagawa et al. | 361/62 |

OTHER PUBLICATIONS

Sekine, Yasuji: "Distribution Technology Overall Manual", p. 10, left column, lines 8–28; p. 10, left column, line 29 to p. 12, right column, line 1; p. 360, right column, line 6 to p. 361, right column, line 7, published by Ohm Co. (Nov. 30, 1991).

* cited by examiner

Primary Examiner—Brian Sircus
Assistant Examiner—Danny Nguyen
(74) Attorney, Agent, or Firm—Leydig, Voit & Mayer, Ltd.

(57) ABSTRACT

A ground relay system is provided which includes: first current transformers located in the respective phases of a sending end of a high-voltage distribution provided from a distribution substation; over-current relays connected to the first transformers; distribution transformers located in the respective phases in the respective sections of the distribution; second current transformers connected to secondary sides of the distribution transformers; current converters connected to the second transformers; and a current comparator that introduces the currents of the respective phases of the sending end of the distribution from the relays to produce a first zero-phase current, introduces the currents of the respective phases of a load end of the high-voltage distribution from the current converters to produce a second zero-phase current, and operates a ground protection relay that opens a circuit breaker inserted at the sending end of the high-voltage distribution if the level of the first current is larger.

3 Claims, 13 Drawing Sheets

PRIOR ART

GROUND RELAY SYSTEM IN A MULTIPLEX DIRECT GROUNDING SYSTEM

BACKGROUND OF THE INVENTION

1. Field of the Invention

The present invention relates to a ground relay system in a multiplex direct grounding system which is capable of appropriately detecting a grounding failure caused by a load imbalance of a multiplex direct grounding system distribution.

2. Description of the Related Art

Figure 11:
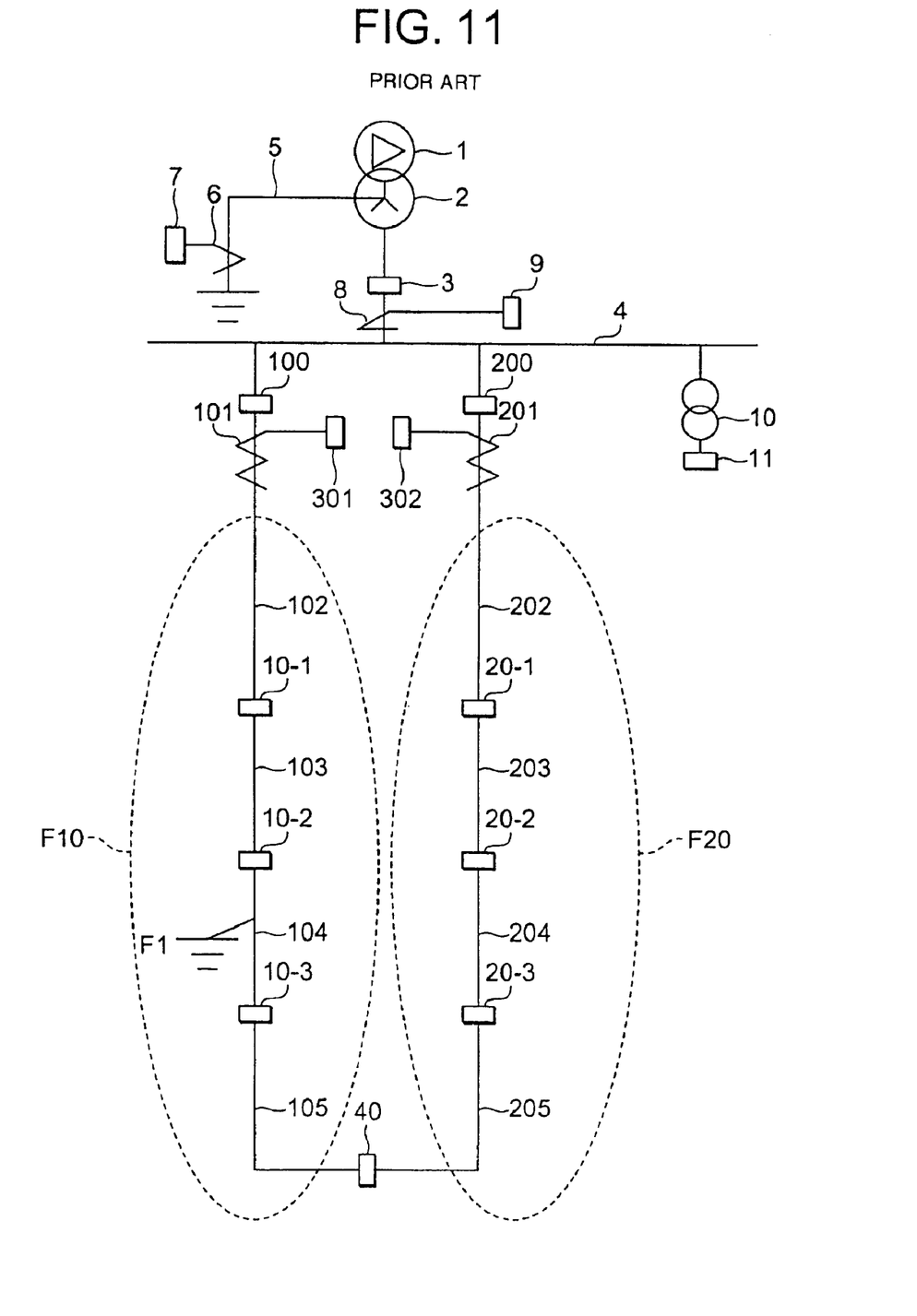
FIG. 11 is a circuit diagram showing a conventional ground relay system in a multiplex direct grounding system.

A conventional ground relay system in a multiplex direct rounding system will be described with reference to the accompanying drawings. FIG. 11 is a circuit diagram showing a conventional relay system in a multiplex direct grounding system in a high-voltage distribution system.

Referring to FIG. 11, reference numeral 1 denotes a distribution main transformer primary side winding, 2 is a distribution main transformer secondary side wiring, 3 is a transformer secondary side circuit breaker, 4 is a main transformer secondary side bus, 5 is a neutral point ground line at a main transformer secondary side, 6 is a CT (current transformer) attached to the neutral point ground line 5, 7 is a ground over-current relay that is connected to a CT secondary side circuit, 8 is a main transformer secondary side CT attached to the main transformer secondary side, 9 is an over-current relay attached to the secondary side of the CT 8, 10 is a PT (transformer) attached to the main transformer secondary side bus 4, and 11 is a relay for an overvoltage or undervoltage.

Also, in the figure, reference numerals 100 and 200 denote circuit breakers of feeders F10 and F20, respectively, 101 and 201 are CTs (current transformers) located on the feeders F10 and F20, respectively, 301 and 302 are protection relays made up of an over-current relay and a ground over-current relay, 102 and 202 are first sections, 10-1 and 20-1 are second section switches, 103 and 203 are second sections, 10-2 and 20-2 are third section switches, 104 and 204 are third sections, 10-3 and 20-3 are fourth section switches, 105 and 205 are fourth sections, and 40 is a switch that associates the feeder F10 with the feeder F20.

In FIG. 11, distribution transformers, for example, columnar transformers are connected between the respective phases A, B, C and the ground, or between the respective phases from the section 102 to the section 105 and from the section 202 to the section 205. However, in the multiple direct grounding system, there are very many cases in which the distribution transformers are connected between the respective phases and the ground.

Figure 12:
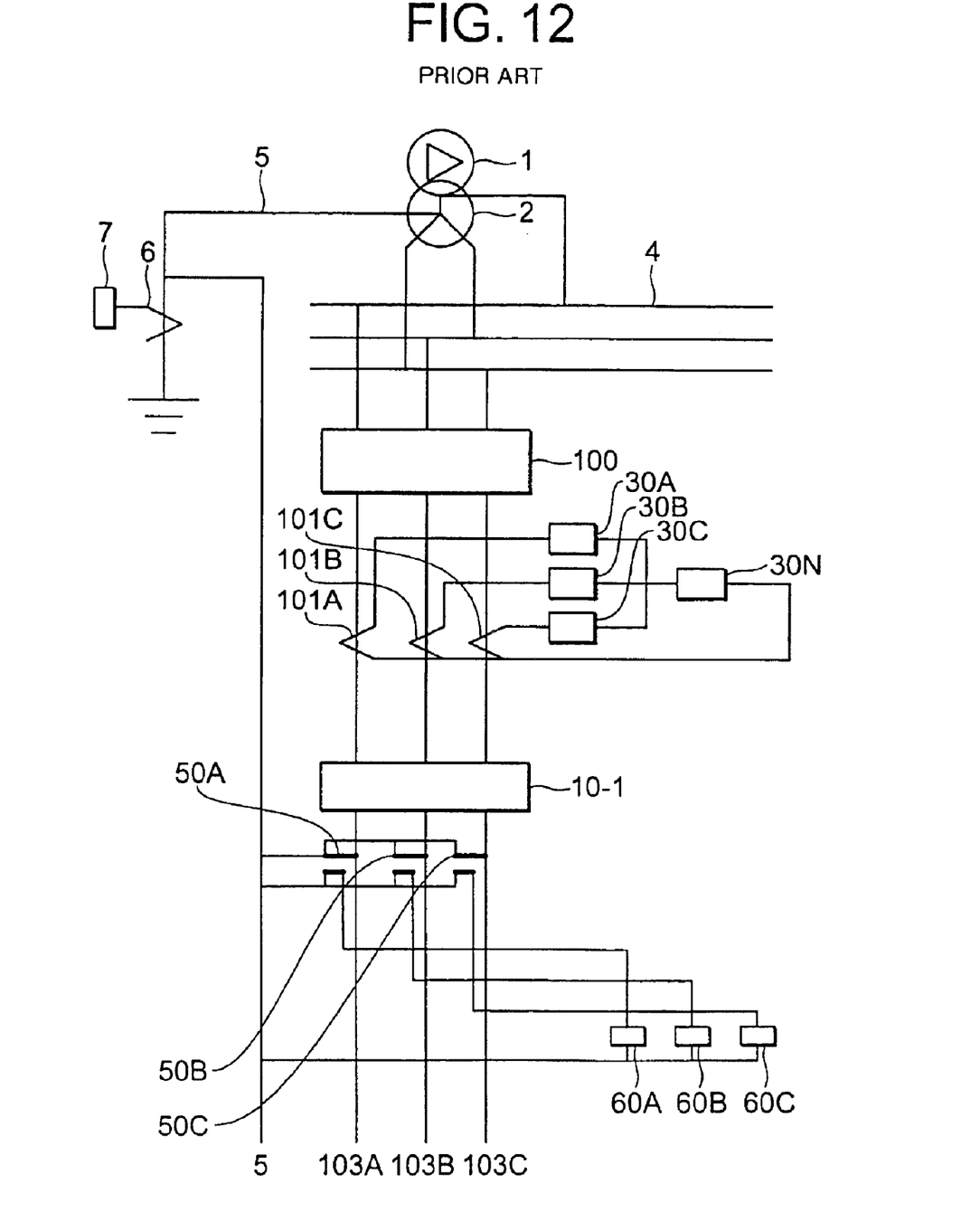
FIG. 12 is a detailed circuit diagram showing the conventional ground relay system in a multiplex direct grounding system.

FIG. 12 is a circuit diagram showing the details of FIG. 11.

Referring to FIG. 12, the same references denote like parts in FIG. 11. References 101A, 101B and 101C denote CTs located in the respective phases, 30A, 30B and 30C are over-current relays, and 30N is a ground over-current relay.

Also, in the figure, references 50A, 50B and 50C denote the distribution transformers in the respective phases of the distribution, and 60A, 60B and 60C are loads connected to the respective phases.

The distribution transformers 50A, 50B and 50C and the loads 60A, 60B and 60C are connected between the respective phases of the distribution and the ground line 5, and there are very many cases in which the amount of load is different in the respective phases depending on the sections. There is an extreme case in which a load of only the phase A is connected.

In addition, in the respective instantaneous values, it is impossible that the three phases are balanced with each other but always unbalanced with each other, as a result of which a residual current flows in the neutral line. That is, a current also appears in a residual circuit at the secondary side of the CT 101, and the ground over-current relay 30N may malfunction depending on the magnitude of the current that flows in the residual current.

Figure 13:
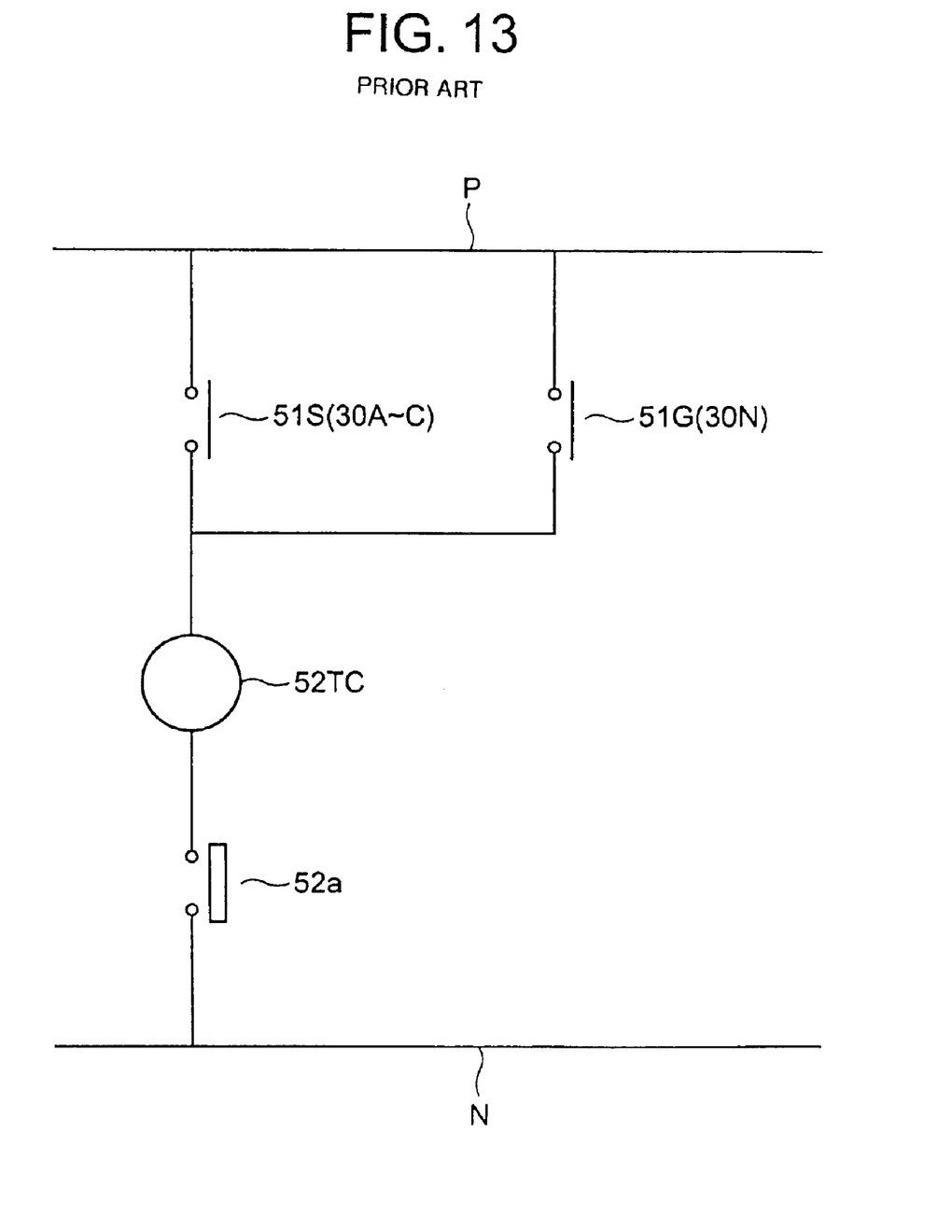
FIG. 13 is a circuit diagram showing a trip circuit of a high-voltage distribution of the conventional ground relay system in a multiplex direct grounding system.

FIG. 13 is a circuit diagram showing a trip circuit of a conventional feed circuit breaker.

Referring to FIG. 13, reference P denotes (+) side of a control power supply, N is a (−) side of the control power supply, 51S is a contact of the over-current relays (30A, 30B, 30C) for short-circuiting protection, 51G is a contact of the ground over-current relay (30N), 52TC is a trip coil of the circuit breaker 100 or 200, and 52a is an auxiliary contact a of the circuit breaker 100 or 200.

Therefore, if the residual current reaches or exceeds the operation level of the ground over-current relay 30N due to an imbalance of the load, it is apparent that the ground over-current relay 30N malfunctions. The malfunction is caused by the apparent zero-phase current produced by the fourth line of the multiplex grounding system, that is, the neutral line and the imbalance of the loads of the respective phases. As a result, the circuit breaker 100 or 200 of the high-voltage distribution is opened by the malfunction of the ground over-current relay 30N even when no real ground fault occurs. Since the conventional distribution system protection is structured as described above, the ground protection cannot be surely conducted, and, in order to prevent the malfunction of the ground over-current relay 30N, the ground over-current relay must be artificially locked.

Since the conventional distribution system protection is structured as described above, the ground protection cannot be surely provided, and, in order to prevent a malfunction of the ground over-current relay 30N, the ground over-current relay must be artificially locked.

SUMMARY OF THE INVENTION

The present invention has been made in order to solve the above-mentioned problems with the conventional art. Therefore an object of the present invention is to provide a ground relay system in a multiplex direct grounding system which is capable of discriminating whether a zero-phase current that flows in a neutral line is caused by an unbalance of a load or by natural grounding and is capable of ensuring the safety of a distribution system and a customer.

In order to achieve the above object, according to the present invention, there is provided a ground relay system in a multiplex direct grounding system including: a plurality of first current transformers located in the respective phases of a sending end of a high-voltage distribution provided from a distribution substation; a plurality of over-current relays connected to the plurality of first current transformers, respectively; a plurality of distribution transformers located in the respective phases in the respective sections of the high-voltage distribution; a plurality of second current transformers connected to secondary sides of the plurality of distribution transformers, respectively; a plurality of current converters connected to the plurality of second current transformers, respectively.

Also, there is provided the ground relay system including: a current comparator that introduces the currents of the respective phases of the sending end of the high-voltage distribution from the plurality of over-current relays and sums the vectors of the respective phases to produce a first zero-phase current, introduces the currents of the respective phases of a load end of the high-voltage distribution from the plurality of current converters and sums the vectors of the respective phases to produce a second zero-phase current, compares the levels of the first and second zero-phase currents with each other, and operates a ground protection relay that opens a circuit breaker inserted at the sending end of the high-voltage distribution if the level of the first zero-phase current is larger.

With the above structure, there can be obtained an effect that it can be discriminated whether the zero-phase current that flows in the neutral line is caused by the unbalance of the load, and the safety of the distribution system and the customer can be ensured.

According to the present invention, there is provided a ground relay system in a multiplex direct grounding system including: a plurality of first current transformers located in the respective phases of a sending end of a high-voltage distribution provided from a distribution substation; a ground over-current relay connected to the plurality of first current transformers; a plurality of distribution transformers located in the respective phases in the respective sections of the high-voltage distribution, a plurality of second current transformers connected to neutral points at the secondary sides of the plurality of distribution transformers; a plurality of current converters connected to the plurality of second current transformers, respectively.

Also, there is provided the ground relay system including: a current comparator that introduces a zero-phase current of the sending end of the high-voltage distribution from the ground over-current relay to obtain a first zero-phase current, introduces the zero-phase current of a load end of the high-voltage distribution from the plurality of current converters and sums the vector to obtain a second zero-phase current, compares the levels of the first and second zero-phase currents with each other, and operates a ground protection relay that opens a circuit breaker inserted at the sending end of the high-voltage distribution if the level of the first zero-phase current is larger.

With the above structure, there can be obtained an effect that it can be discriminated whether the zero-phase current that flows in the neutral line is caused by the unbalance of the load, and the safety of the distribution system and the customer can be ensured.

According to the present invention, there is provided a ground relay system in a multiplex direct grounding system including: a plurality of first current transformers located in the respective phases of a sending end of a high-voltage distribution provided from a distribution substation; a ground over-current relay connected to the plurality of first current transformers; a plurality of distribution transformers located in the respective phases in the respective sections of the high-voltage distribution, a plurality of second current transformers connected to neutral points at the primary sides of the plurality of distribution transformers; a plurality of current converters connected to the plurality of second current transformers, respectively.

Also, there is provided the ground relay system including: a current comparator that introduces a zero-phase current of the sending end of the high-voltage distribution from the ground over-current relay to obtain a first zero-phase current, introduces the zero-phase current of a load end of the high-voltage distribution from the plurality of current converters and sums the vector to obtain a second zero-phase current, compares the levels of the first and second zero-phase currents with each other, and operates a ground protection relay that opens a circuit breaker inserted at the sending end of the high-voltage distribution if the level of the first zero-phase current is larger.

With the above structure, there can be obtained an effect that it can be discriminated whether the zero-phase current that flows in the neutral line is caused by the unbalance of the load, and the safety of the distribution system and the customer can be ensured.

BRIEF DESCRIPTION OF THE DRAWINGS

These and other objects and advantages of the present invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

(First Embodiment)

Figure 1:
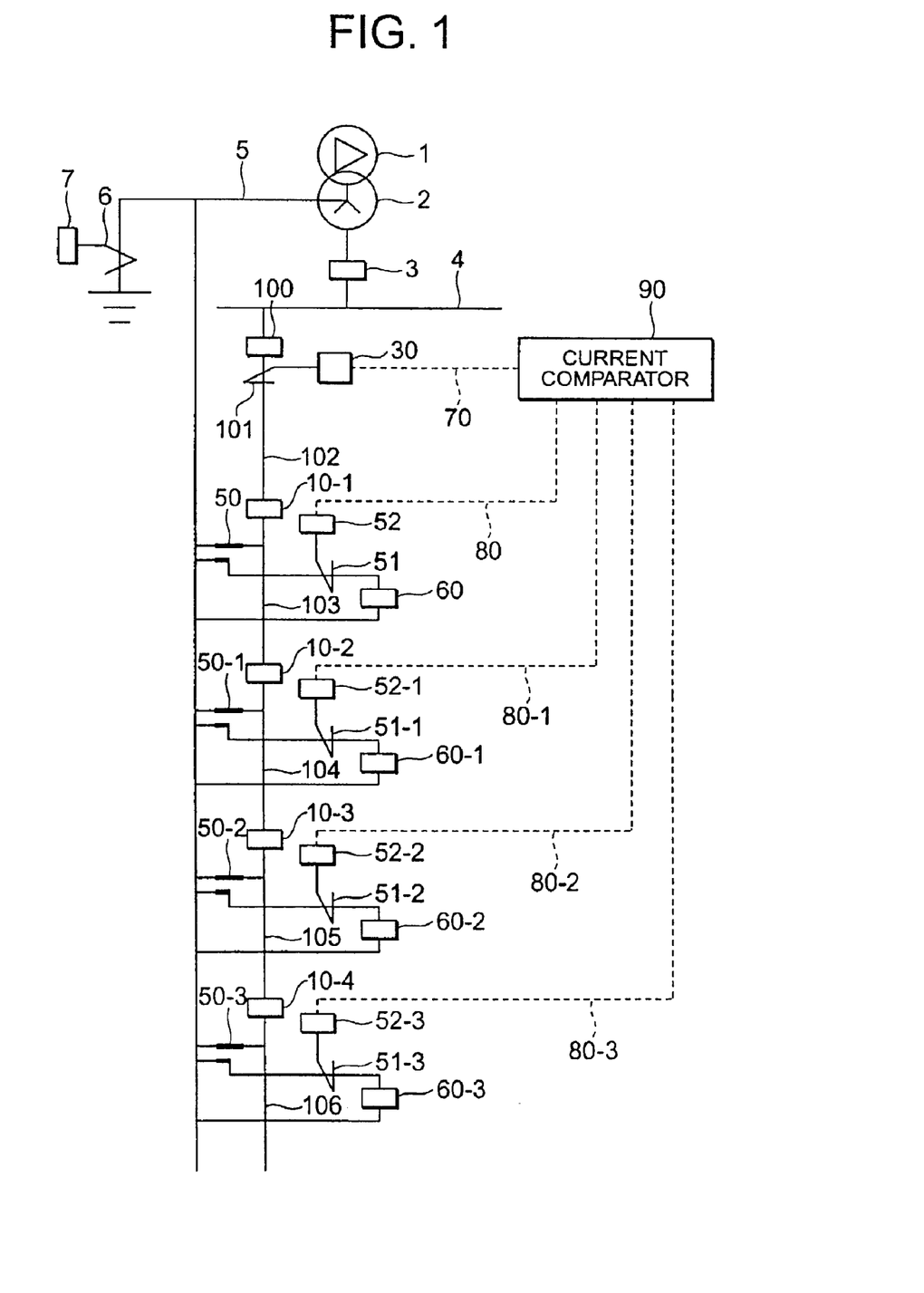
FIG. 1 is a circuit diagram showing a ground relay system in a multiplex direct grounding system in accordance with a first embodiment of the present invention.

A ground relay system in a multiplex direct grounding system in accordance with a first embodiment of the present invention will be described with reference to the accompanying drawings. FIG. 1 is a circuit diagram showing a ground relay system in a multiplex direct grounding system in accordance with the first embodiment of the present invention. In the respective figures, the same references denote identical or corresponding parts.

In FIG. 1, references 50, 50-1, 50-2 and 50-3 denote distribution transformers connected between each of the three phases and the neutral line in distribution sections 103, 104, 105 and 106, and there exist various modes in which the distribution transformers are connected to the three phases, connected to two phases among those three phases, and connected to only one phase among those three phases. Also, there is a case in which the respective phases are connected to the load in an unbalance state although being connected to the three phases (for example, the phase A is 75 kVA, the phase B is 50 kVA and the phase C is 75 kVA).

Also, in the figure, references 60, 60-1, 60-2 and 60-3 denote customer loads connected to the respective distribution transformers 50, 50-1, 50-2 and 50-3, references 51, 51-1, 51-2 and 51-3 are CTs (current transformers) that derive the secondary currents of the distribution transformers 50, 50-1, 50-2 and 50-3, references 52, 52-1, 52-2 and 52-3 are current converters that convert the above secondary currents into small currents (for example, convert the secondary current of 5 A into a current of 0.1 A) and also convert analog currents into digital values as occasion demands to send the converted values to a remote point, that is, a current comparator 90, and references 80, 80-1, 80-2 and 80-3 are transmission lines through which the output signals of the current converters 52, 52-1, 52-2 and 52-3 are transmitted to the current comparator 90, and may be made of metal communication lines, coaxial cables, optical cables, radio or power-line carrier using a power line.

In addition, in the figure, reference numeral 30 denotes a current converter that converts the current of the distribution which has been detected by a CT 101 into a small current, and 70 is a transmission line that transmits the output signal of the current converter 30 to the current comparator 90, which may be made of a metal communication line, a coaxial cable, an optical cable, radio or power-line carrier using a power line.

In FIG. 1, the load current in each of the sections of the high-voltage distribution is transmitted to the current comparator 90 and then compared with the current sent by the sending end of the distribution to detect only the grounding fault at the high-voltage distribution due to the residual current (zero-phase current) based on the load unbalance that always occurs.

Figure 2:
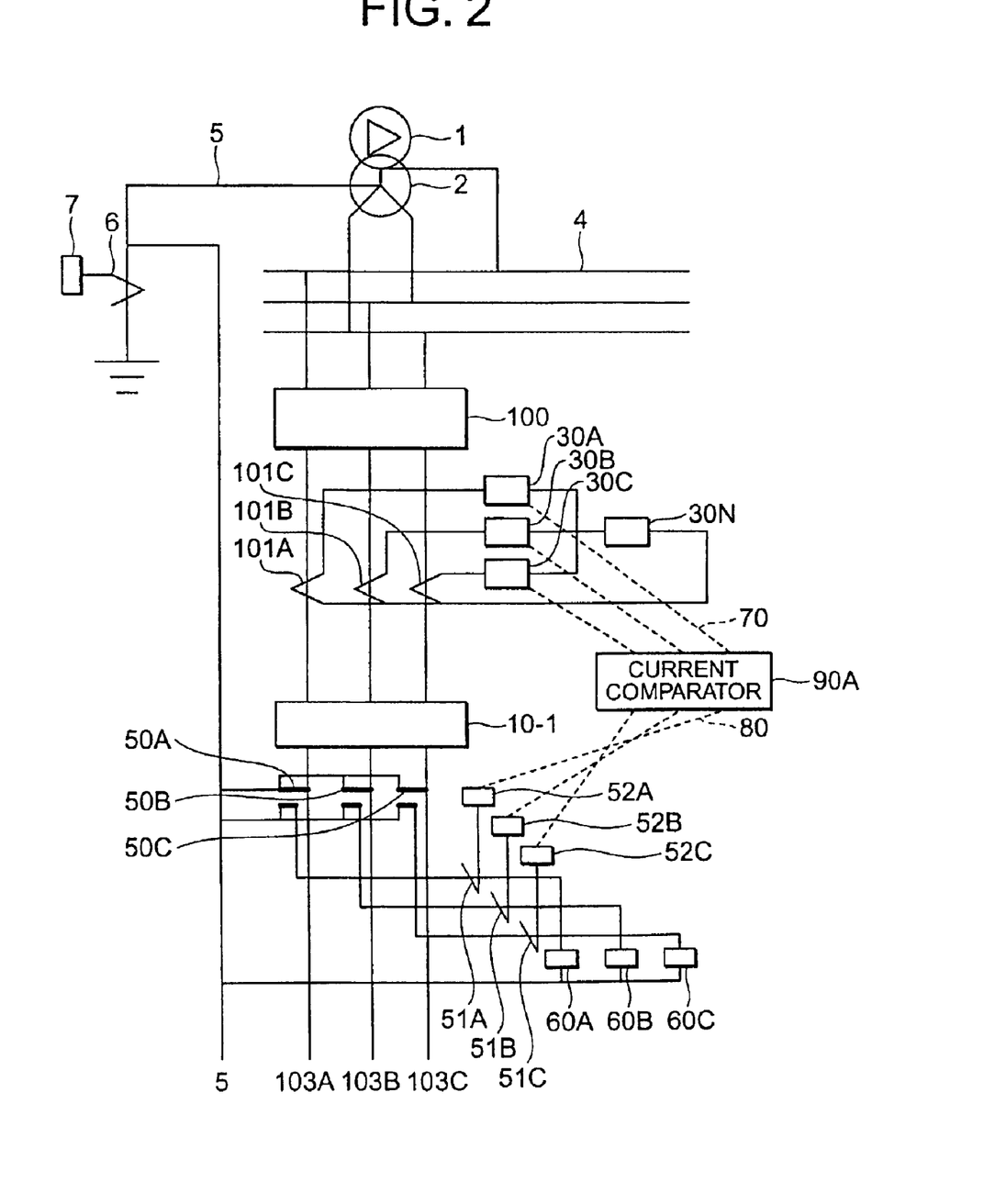
FIG. 2 is a detailed circuit diagram showing the ground relay system in a multiplex direct grounding system in accordance with the first embodiment of the present invention.

FIG. 2 is a circuit diagram showing the details of FIG. 1.

In FIG. 2, references 30A, 30B and 30C denote over-current relays of the respective phases of the distribution, which have a function of converting currents that pass through the over-current relays into small currents (converting analog currents into digital values as occasion demands). References 50A, 50B and 50C denote distribution transformers, references 51A, 51B and 51C are CTs (current transformers) which derive the secondary side currents of the distribution transformers 50A, 50B and 50C, and references 52A, 52B and 52C are current converters that convert the secondary side currents into small currents (convert analog currents into digital values as occasion demands). Reference numerals 60A, 60B and 60C denote loads of the respective phases of the distribution which are disposed in the respective sections, respectively. Reference numeral 80 denotes a transmission line that transmits the output signals of the current converters 52A, 52B and 52C to the current comparator 90, which correspond to the respective phases. The transmission lines 70 and 80 are shown in each of the phases in the figure, but the signals may be multiplexed so as to provide one transmission path without being deviated from the purpose of the present invention.

Figure 3:
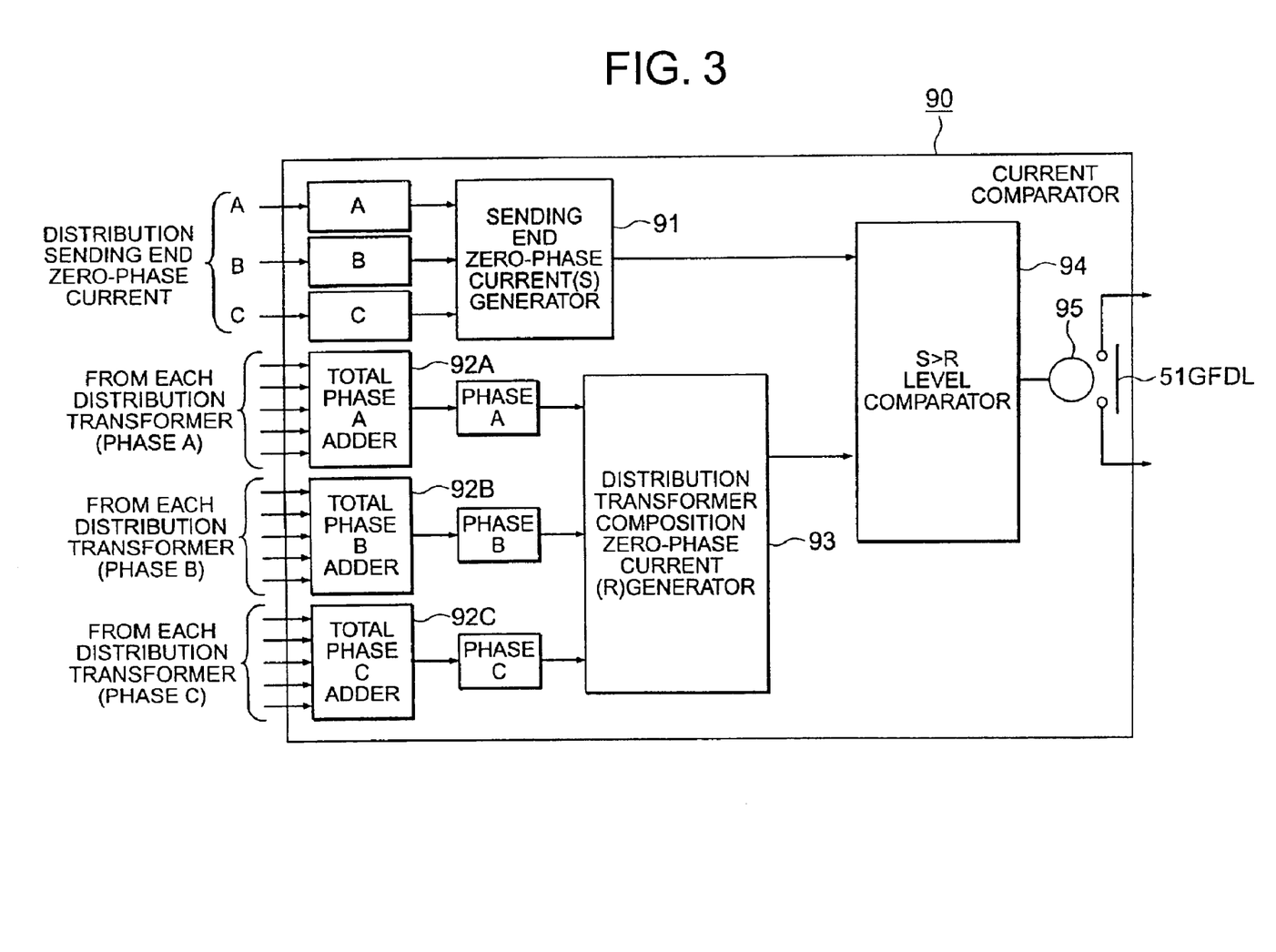
FIG. 3 is a circuit diagram showing a current comparator of the ground relay system in a multiplex direct grounding system in accordance with the first embodiment of the present invention.

FIG. 3 is a detailed circuit diagram showing the current comparator.

In FIG. 3, after the currents of the respective phases at the sending end of the high-voltage distribution have been introduced in the respective phases A, B and C, the vectors of the respective phases are summed to generate a zero-phase current (S) by a sending end zero-phase current generator 91. Also, the vectors are summed from the currents transmitted from the current converter 52 of the distribution transformer 50 in each of the sections of the distribution in each of the phases by a total phase-A adder 92A, a total phase-B adder 92B and a total phase-C adder 92C, and a composition zero-phase current (R) of the distribution transformer 50 is produced from the vector composition phase currents of the respective phases by a distribution transformer composition zero-phase current generator 93. A level comparator 94 compares the level of the zero-phase current between the sending end (S) and the load end (R), and if the condition of S>R is satisfied, a grounding protection relay 95 operates to close a contact 51GFDL.

The above-mentioned operation makes it possible to prevent the conventional ground over-current relay 30N from malfunctioning due to the apparent zero-phase current based on the unbalance current, thereby being capable of making the grounding protection of the high-voltage distribution reliable.

Figure 4:
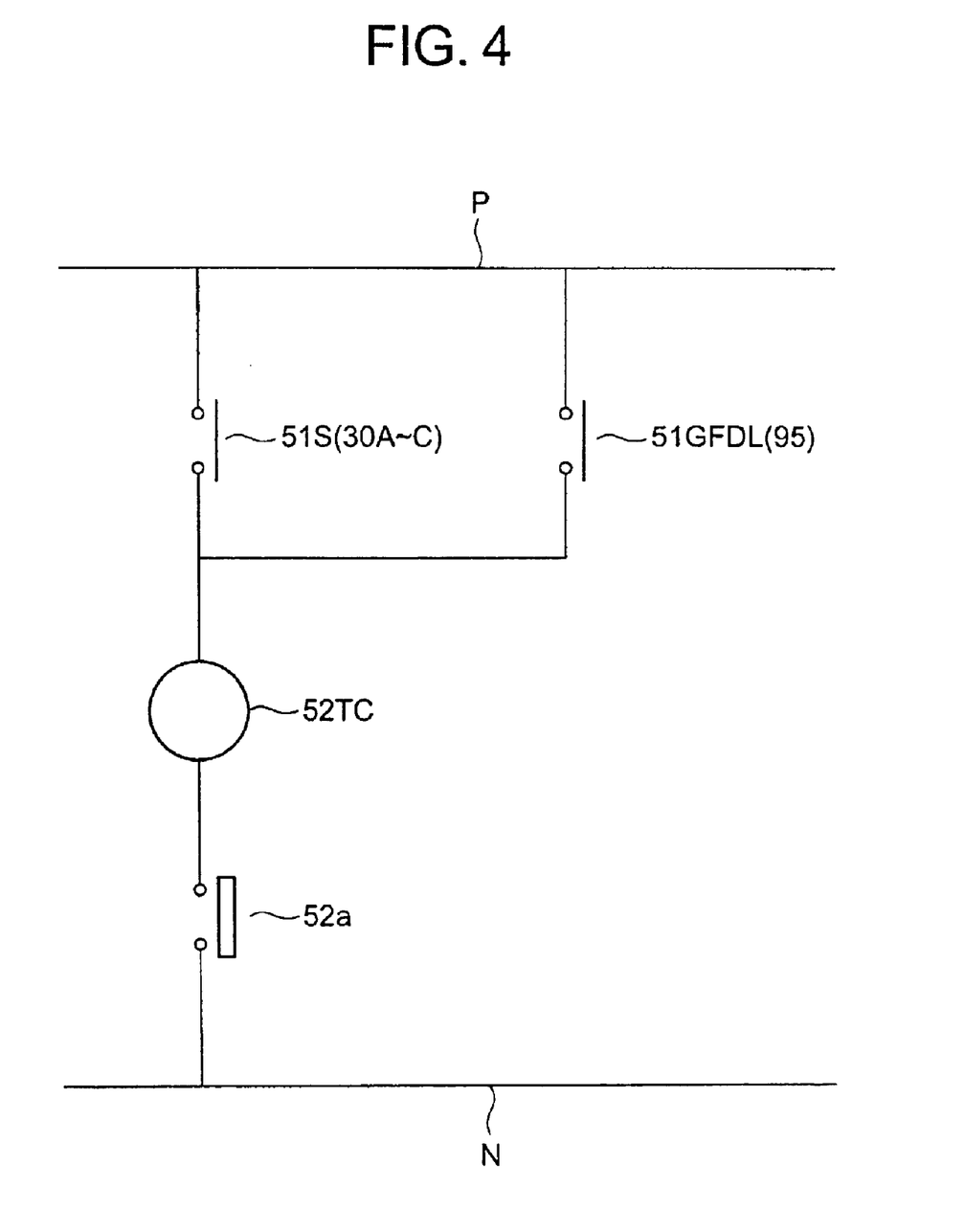
FIG. 4 is a circuit diagram showing a trip circuit of a high-voltage distribution circuit breaker in accordance with the first embodiment of the present invention.

FIG. 4 is a circuit diagram showing a trip circuit of the distribution circuit breaker in accordance with the first embodiment.

In FIG. 4, reference P denotes a (+) side of a control power supply, N denotes a (−) side of the control power supply, 51S is a contact of the over-current relay (30A, 30B, 30C) for short-circuiting protection, 51GFDL is a contact of a ground protection relay (95), 52TC is a trip coil of a distribution circuit breaker 100, and 52a is an auxiliary contact a of the distribution circuit breaker 100.

In the conventional system, because the grounding protection cannot be conducted with a high sensitivity and operating level is made high or the ground over-current relay 30N is locked, the intended purpose of protection disappears. According to the effects of the first embodiment, such many problems in that humans and beasts may be damaged and fire may occur due to the ground current because the ground accident cannot be detected in the worst case can be surely eliminated.

(Second Embodiment)

Figure 5:
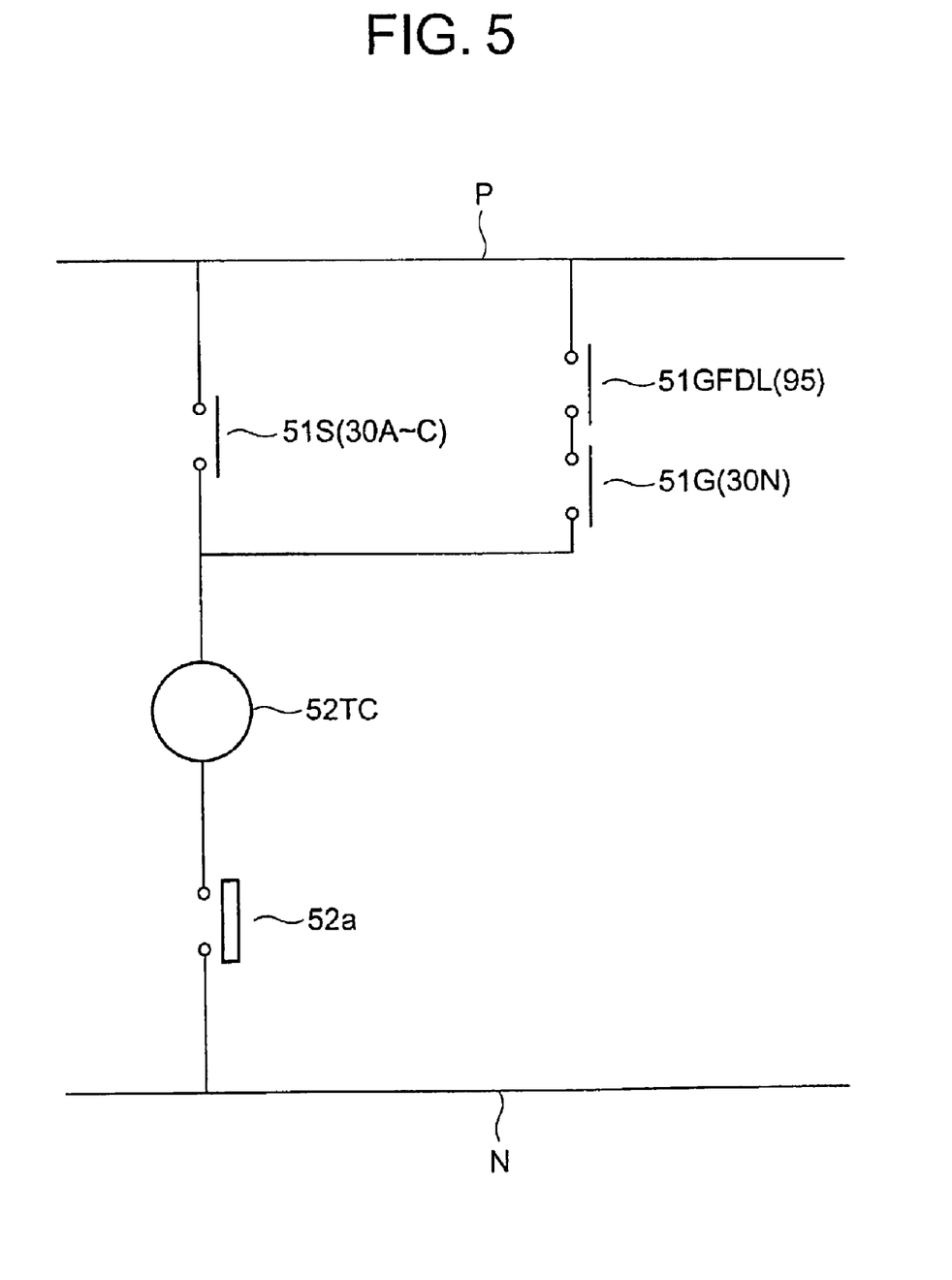
FIG. 5 is a circuit diagram showing a trip circuit of a high-voltage distribution circuit breaker in accordance with a second embodiment of the present invention.

A ground relay system in a multiplex direct grounding system in accordance with a second embodiment of the present invention will be described with reference to the accompanying drawings. FIG. 5 is a circuit diagram showing a trip circuit of a distribution circuit breaker of the ground relay system in a multiplex direct ground system in accordance with the second embodiment of the present invention.

In FIG. 5, reference 51G denotes a contact of the ground over-current relay 30N of the conventional type in which the contact 51GFDL of the ground protection relay 95 is one of the trip condition so as to prevent the malfunction.

With the above structure, the ground over-current relay 51G for ground protection of the conventional type can be employed as it is, thereby being capable of providing the high reliable ground protection.

(Third Embodiment)

Figure 6:
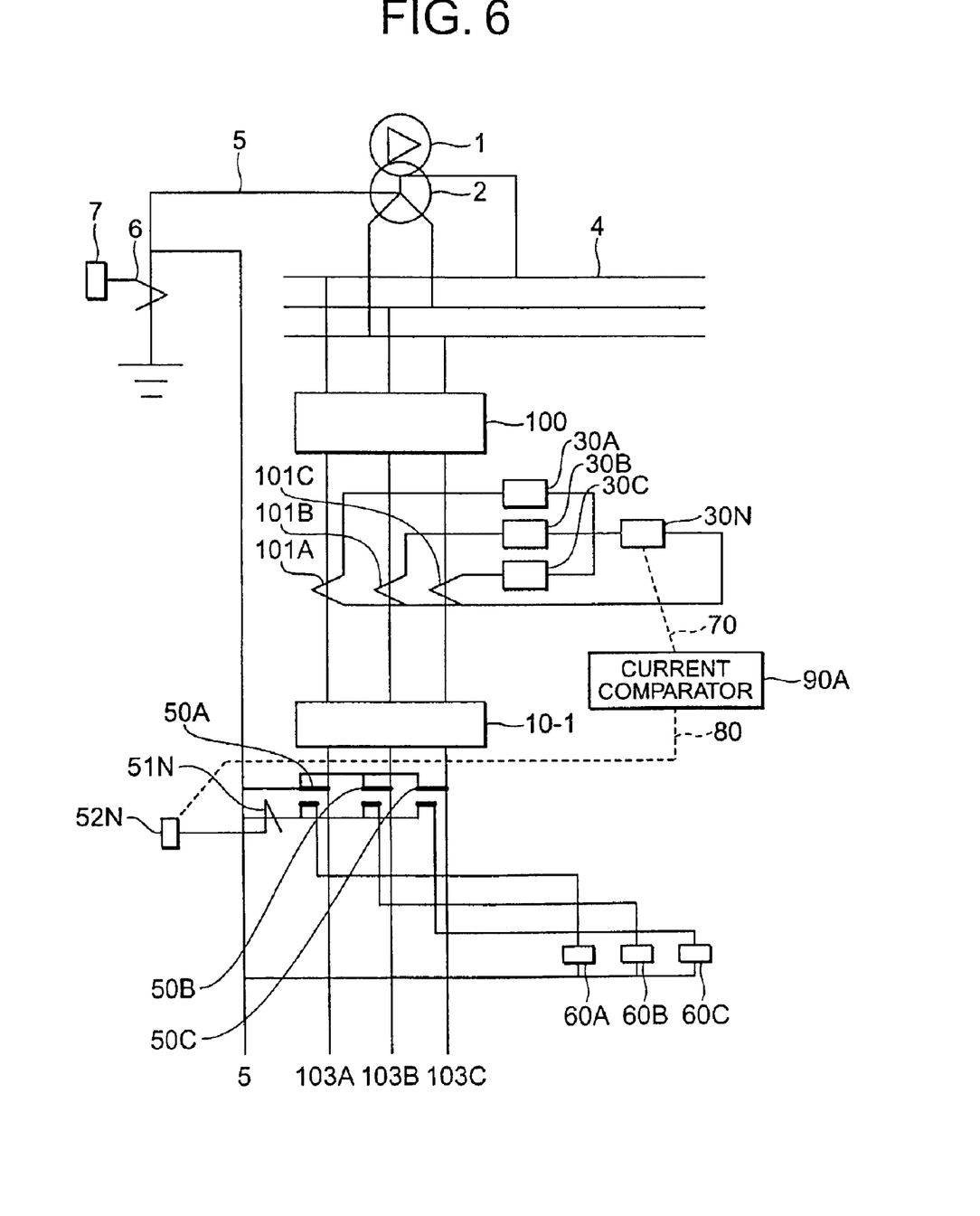
FIG. 6 is a circuit diagram showing a ground relay system in a multiplex direct grounding system in accordance with a third embodiment of the present invention.

A ground relay system in a multiplex direct grounding system in accordance with a third embodiment of the present invention will be described with reference to the accompanying drawings. FIG. 6 is a circuit diagram showing the ground relay system in a multiplex direct ground system in accordance with the third embodiment of the present invention.

In FIG. 6, reference 51N denotes a CT (current transformer) that detects a current at the secondary side neutral point of the distribution transformer 50, and 52N is a current converter that converts that current into a small current (converts an analog current into a digital value as occasion demands).

Also, in the figure, reference 30N has the functions of a conventional ground over-current relay and a current converter that converts a current that passes through the conventional ground over-current relay into a small current (converts an analog current into a digital value as the occasion demands). Reference numeral 70 denotes a transmission line through which a current signal at the sending end of the distribution is transmitted, and 80 denotes a transmission line through which a current signal at the secondary side neutral point of each the distribution transformer 50 in each of the sections is transmitted to the current comparator 90A.

That is, the third embodiment is directed to a system in which the total zero-phase currents at the sending end and the load end of the high-voltage distribution are compared in magnitude with each other.

Figure 7:
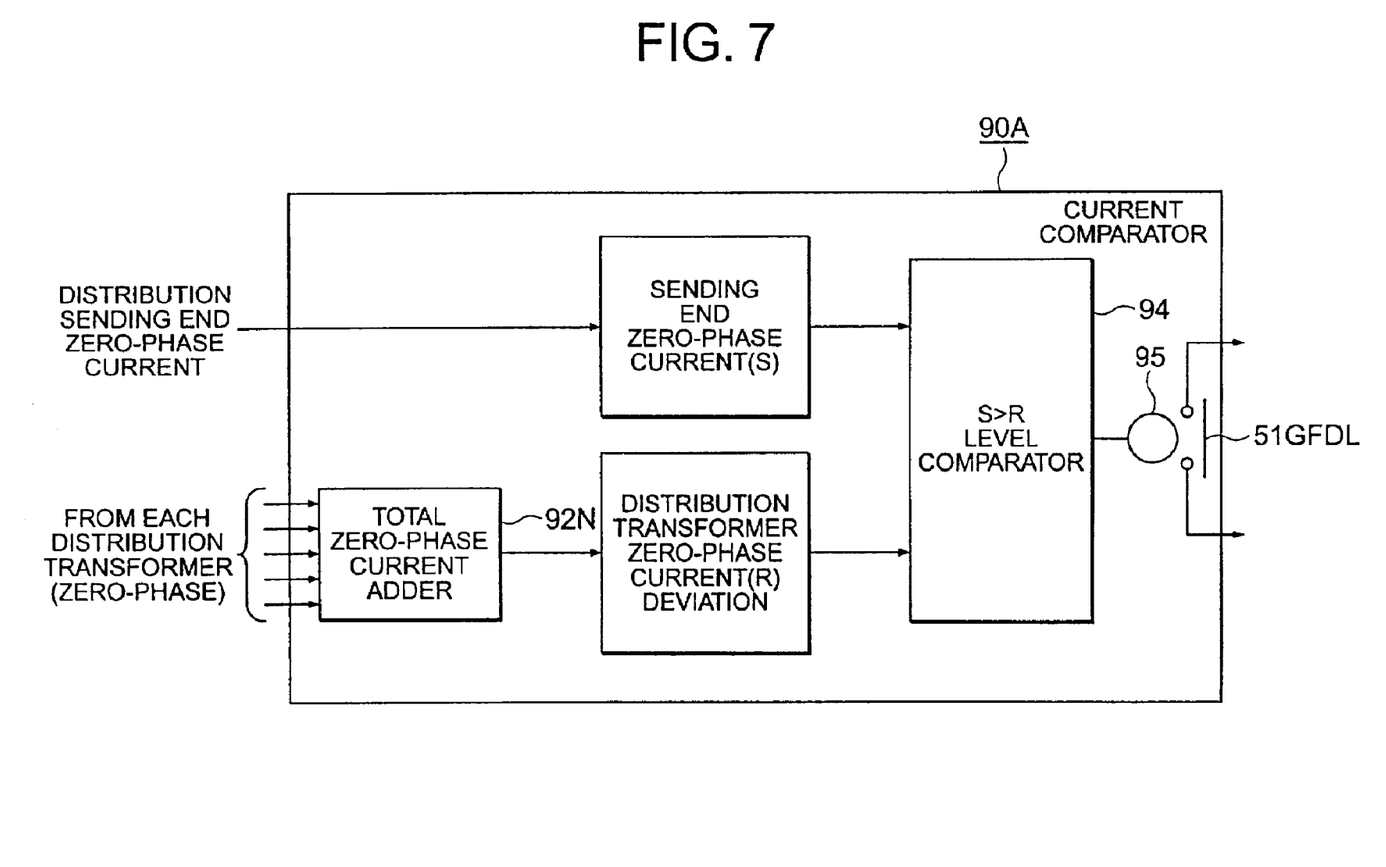
FIG. 7 is a circuit diagram showing a current comparator of the ground relay system in a multiplex direct grounding system in accordance with the third embodiment of the present invention.

FIG. 7 is a circuit diagram showing the current comparator of the ground relay system in a multiplex direct ground system in accordance with the third embodiment of the present invention.

In FIG. 7, the current comparator 90A compares the zero-phase current (R) in each of the sections which has been directly detected with the zero-phase current (S) at the sending end of the high-voltage distribution which has been directly detected likewise. The total zero-phase current adder 92N sums the vectors of the zero-phase currents at the neutral points at the secondary sides of the respective distribution transformers 50 disposed in the respective sections of the respective distributions to obtain the distribution transformer zero-phase current (R). Also, the zero-phase current detected by the ground over-current relay 30N is set as the sending end zero-phase current (S) of the distribution. Those two values are compared with each other by the level comparator 94, and in case of S>R, the ground protection relay 95 is operated to close the contact 51GFDL.

In this case, the trip circuit can be structured as in FIG. 4 described above. Also, the trip circuit can be structured as in FIG. 5 described above.

(Fourth Embodiment)

Figure 8:
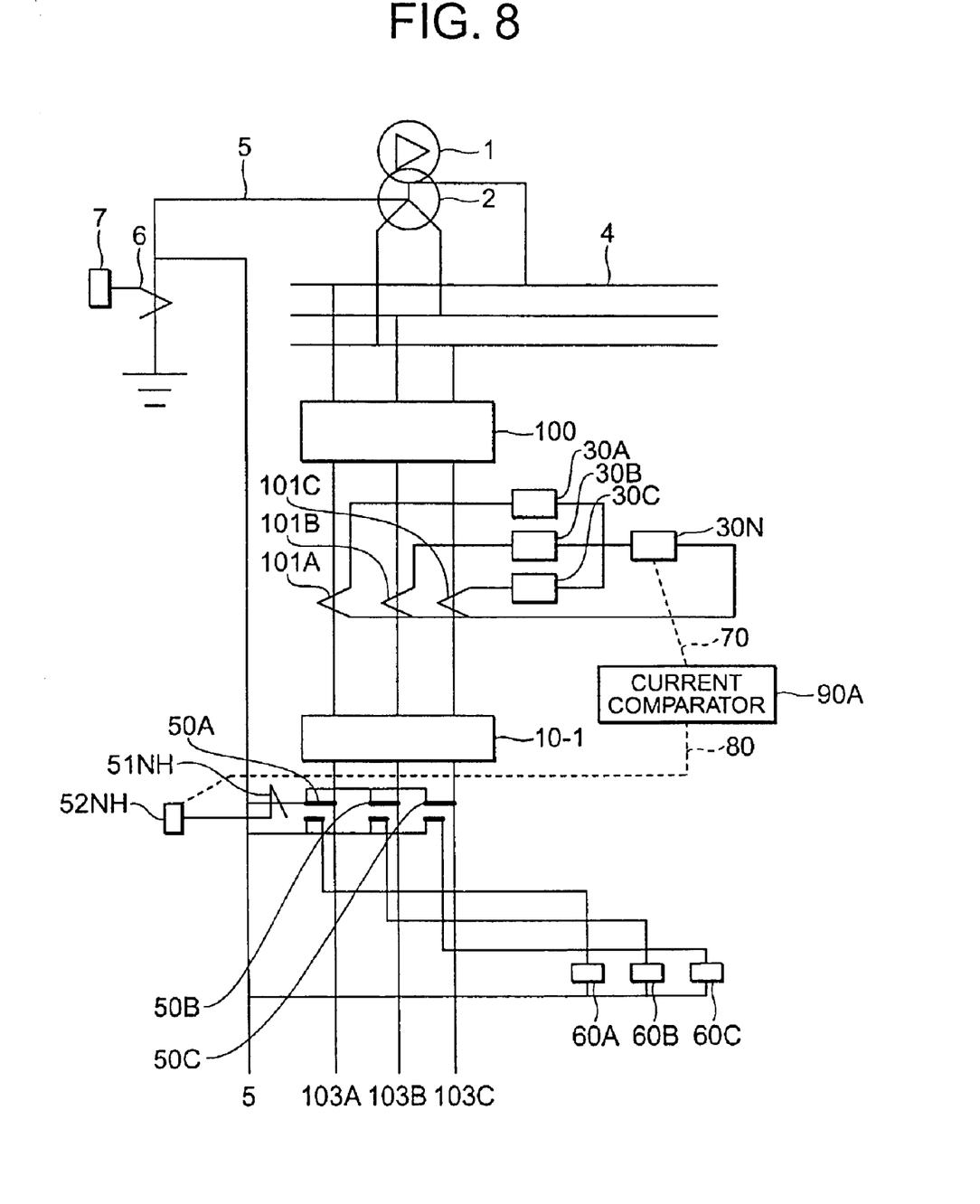
FIG. 8 is a circuit diagram showing the a ground relay system in a multiplex direct grounding system in accordance with a fourth embodiment of the present invention.

A ground relay system in a multiplex direct grounding system in accordance with a fourth embodiment of the present invention will be described with reference to the accompanying drawings. FIG. 8 is a circuit diagram showing the ground relay system in a multiplex direct ground system in accordance with the fourth embodiment of the present invention.

In FIG. 8, reference 51NH denotes a CT (current transformer) connected at the neutral point of the primary side of the distribution transformer 50, that is, the high-voltage side in each section of the high-voltage distribution, and 52NH denotes a current converter thereof.

Because the zero-phase current at the high-voltage side of the distribution transformer 50 is used, and the same level as that of the sending end, that is, the same CT ratio as that of the CT101 at the sending end can be used, the electrical quantities of them are correctly compared with each other, thereby being capable of detecting the ground accident defined to only the high-voltage distribution.

In FIG. 8, reference 30N adds a function of the current converter to the conventional ground over-current relay, but even if the conventional ground over-current relay remains as it is, and another current converter having a function of achieving the purpose is provided, the effects of the present invention are not prevented.

A manner of taking the total sum of the zero-phase currents from the respective distribution transformers 50 and a method of comparing the zero-phase current from the distribution transformer 50 with the zero-phase current obtained from the sending end of the high-voltage distribution can be realized by the same method and the similar means as those in the above-mentioned third embodiment, and the current comparator has the circuit structure shown in FIG. 7. The contact GFDL is replaced by a contact GFDH.

Figure 9:
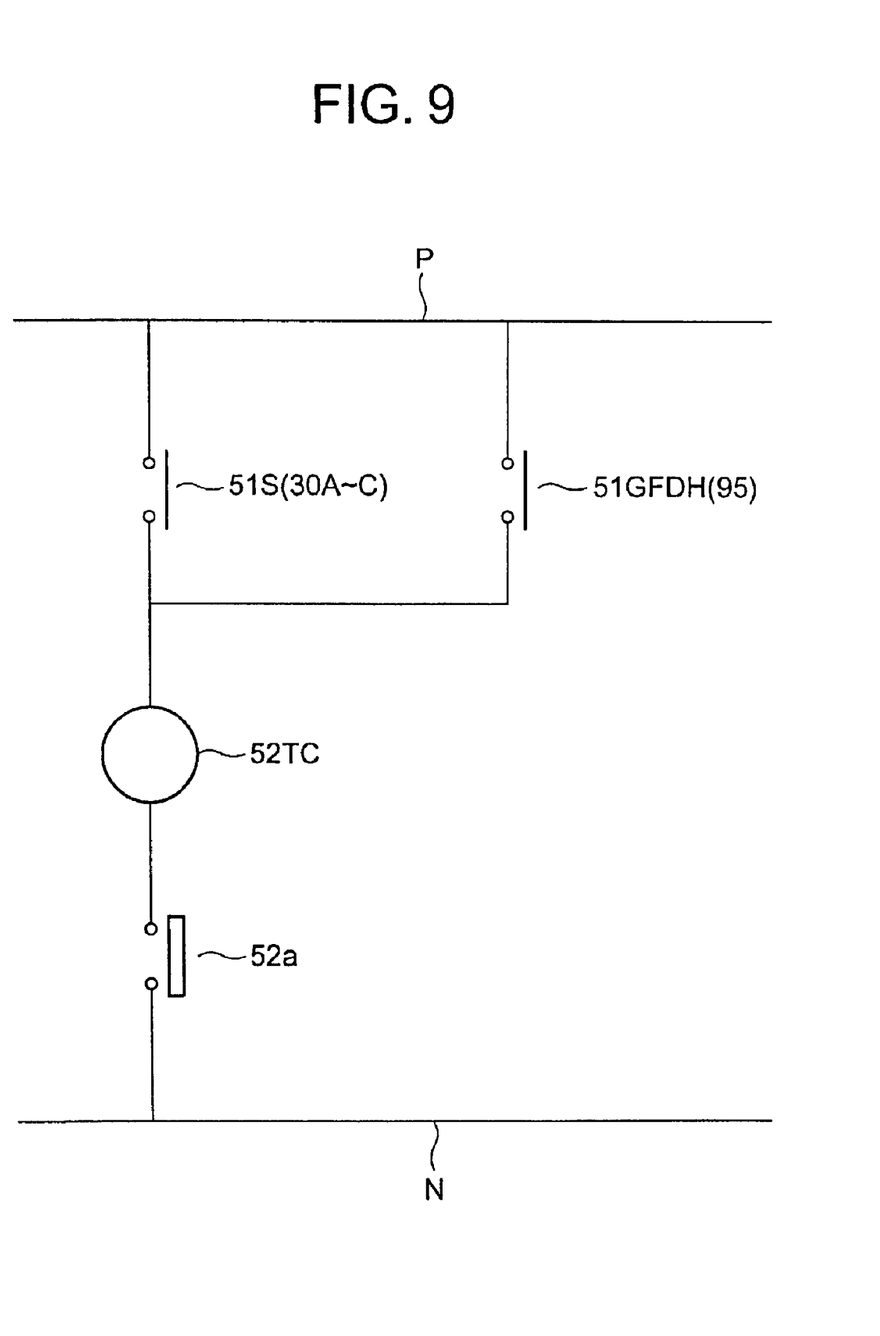
FIG. 9 is a circuit diagram showing a trip circuit of a high-voltage distribution circuit breaker in accordance with the fourth embodiment of the present invention.

FIG. 9 is a circuit diagram showing the trip circuit of the circuit breaker in accordance with the fourth embodiment.

In FIG. 9, reference P denotes the (+) side of the control power supply, N denotes the (−) side of the control power supply, 51S is a contact of the over-current relay (30A, 30B, 30C) for short-circuiting protection, 51GFDH is a contact of the ground protection relay 95, 52TC is a trip coil of the distribution circuit breaker 100, and 52a is an auxiliary contact a of the distribution circuit breaker 100.

Figure 10:
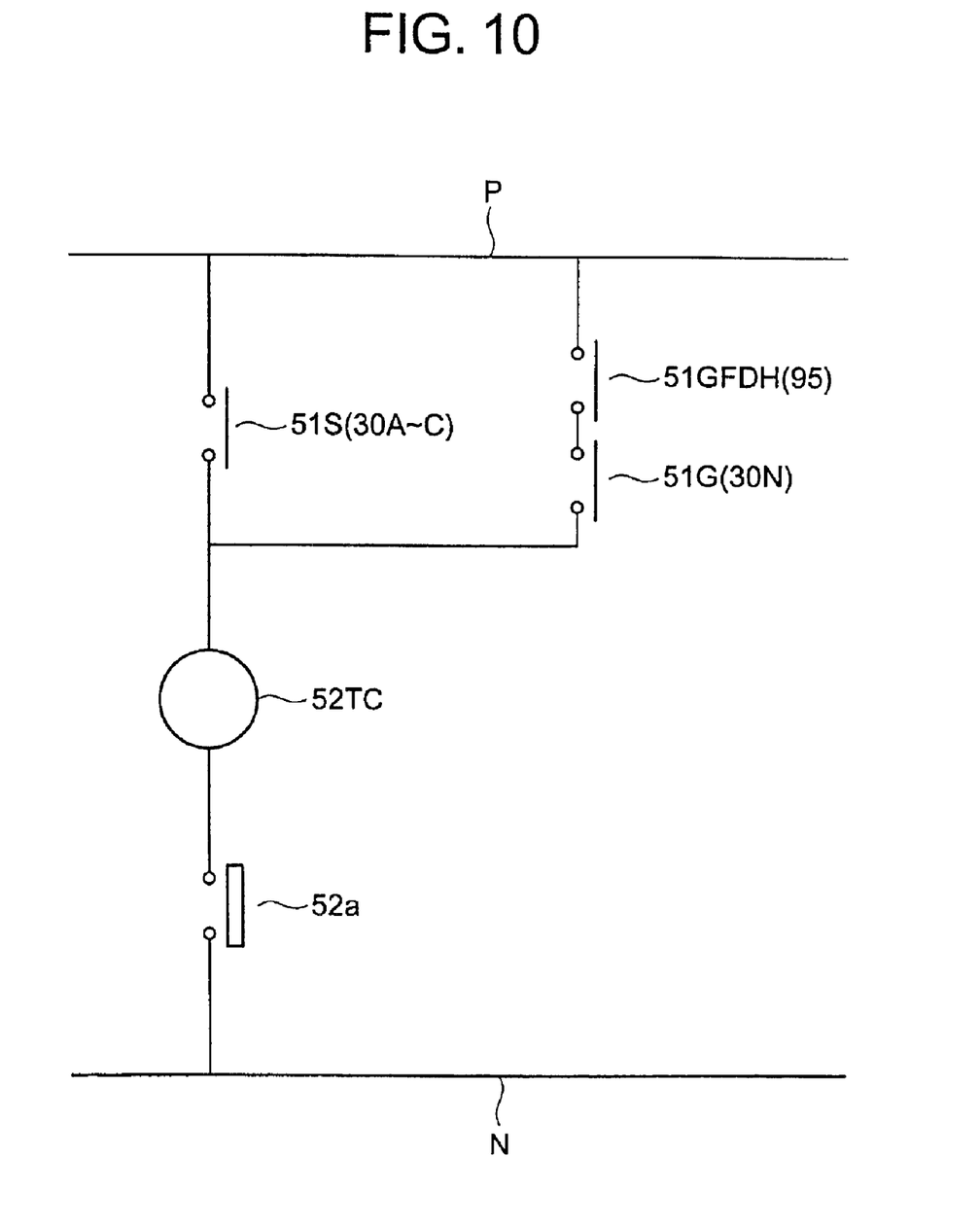
FIG. 10 is a circuit diagram showing another trip circuit of a high-voltage distribution circuit breaker in accordance with the fourth embodiment of the present invention.

FIG. 10 is a circuit diagram showing another trip circuit of the circuit breaker in accordance with the fourth embodiment of the present invention.

In FIG. 10, reference P denotes the (+) side of the control power supply, N is the (−) side of the control power supply, 51S is a contact of the over-current relay (30A, 30B, 30C) for short-circuiting protection, 51GFDH is a contact of the ground protection relay 95, 52TC is a trip coil of the distribution circuit breaker 100, and 52a is an auxiliary contact a of the distribution circuit breaker 100. Also, the contact 51GFDH of the ground protection relay 95 is connected in series to the contact 51G of the conventional ground over-current relay 30N, whereby it is possible to prevent the ground over-current relay 51G from malfunctioning.

As described above, according to the respective first to fourth embodiments, in conducting the grounding protection of the high-voltage distribution with a high sensitivity, it is possible to prevent the malfunction of the conventional ground over-current relay due to the zero-phase current generated on the basis of the unbalance of the load, and it is also possible to provide surer safety with respect to the equipment, humans and beasts.

Also, in the current comparators shown in FIGS. 3 and 7, the system in which the comparison of S>R is conducted is applied, but, it is possible to readily realize that the ground accident of the high-voltage distribution is directly detected provided that S−R>K (K is a constant) is satisfied.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A ground relay system in a multiplex direct grounding system comprising:

a plurality of first current transformers sensing currents flowing in respective phases of a sending end of a distributed high-voltage distributed from a distribution substation;

a plurality of over-current relays respectively connected to corresponding current transformers of the plurality of first current transformers;

a plurality of distribution transformers connected to the respective phases of the distributed high-voltage;

a plurality of second current transformers respectively sensing currents flowing in secondary sides of corresponding distribution transformers of the plurality of distribution transformers;

a plurality of current converters respectively connected to corresponding second current transformers of the plurality of second current transformers;

a current comparator that sums current vectors of the currents flowing in respective phases of the sending end and sensed by the plurality of first current transformers to produce a first zero-phase current, sums current vectors of the currents flowing in respective phases of a load end, sensed by the plurality of second current transformers through the plurality of current converters, to produce a second zero-phase current, compares the first and second zero-phase currents with each other, and operates a ground protection relay that opens a circuit breaker inserted at the sending end of the high-voltage distributed if the first zero-phase current is larger than the second zero-phase current; and a ground over-current relay connected to the plurality of over-current relays, wherein, in a trip circuit of the circuit breaker, a contact of the ground protection relay and a contact of the ground over-current relay are connected in series, and a malfunction of the existing ground over-current relay is locked by the ground protection relay.

2. A ground relay system in a multiplex direct grounding system comprising:

a plurality of first current transformers sensing currents flowing in respective phases of a sending end of a distributed high-voltage distributed from a distribution substation;

a ground over-current relay connected to the plurality of first current transformers;

a plurality of distribution transformers connected to the respective phases of the distributed high-voltage;

a plurality of second current transformers respectively sensing currents flowing at neutral points at secondary sides of corresponding distribution transformers of the plurality of distribution transformers;

a plurality of current converters respectively connected to corresponding second current transformers of the plurality of second current transformers; and a current comparator that obtains a zero-phase current at the sending end of the distributed high-voltage, from the ground over-current relay, as a first zero-phase current, sums zero-phase current vectors of the currents flowing at a load end of the distributed high-voltage, sensed by the plurality of second current transformers through the plurality of current converters, to obtain a second zero-phase current, compares the first and second zero-phase currents with each other, and operates a ground protection relay that opens a circuit breaker inserted at the sending end of the distributed high-voltage if the first zero-phase current is larger than the second zero-phase current, wherein, in a trip circuit of the circuit breaker, a contact of the ground protection relay and a contact of the ground over-current relay are connected in series, and a malfunction of the existing ground over-current relay is locked by the ground protection relay.

3. A ground relay system in a multiplex direct grounding system comprising:

a plurality of first current transformers sensing currents flowing in respective phases of a sending end of a distributed high-voltage from a distribution substation;

a ground over-current relay connected to the plurality of first current transformers;

a plurality of distribution transformers connected to the respective phases of the distributed high-voltage;

a plurality of second current transformers respectively sensing currents flowing at neutral points at primary sides of corresponding distribution transformers of the plurality of distribution transformers;

a plurality of current converters respectively connected to corresponding second current transformers of the plurality of second current transformers; and a current comparator that obtains a zero-phase current at the sending end of the distributed high-voltage, from the ground over-current relay, as a first zero-phase current, sums zero-phase current vectors of the currents flowing at a load end of the distributed high-voltage, sensed by the plurality of second current transformers through the plurality of current converters, to obtain a second zero-phase current, compares the first and second zero-phase currents with each other, and operates a ground protection relay that opens a circuit breaker inserted at the sending end of the distributed high-voltage if the first zero-phase current is larger than the second zero-phase current, wherein, in a trip circuit of the circuit breaker, a contact of the ground protection relay and a contact of the ground over-current relay are connected in series, and a malfunction of the existing around over-current relay is locked by the ground protection relay.

* * * * *